United States Patent [19]

Peck

[11] 4,209,084
[45] Jun. 24, 1980

[54] BRAKE SHOE

[75] Inventor: David E. Peck, Beverly Hills, Mich.

[73] Assignee: Rockwell International Corporation, Pittsburgh, Pa.

[21] Appl. No.: 844,096

[22] Filed: Oct. 20, 1977

[51] Int. Cl.² .............................................. F16D 65/08
[52] U.S. Cl. .................................. 188/250 D; 188/249
[58] Field of Search ............ 188/78, 325, 249, 250 R, 188/250 D, 79.5 GE, 6 C, 250 B

[56] References Cited

U.S. PATENT DOCUMENTS

| | | | |
|---|---|---|---|
| 1,567,846 | 12/1925 | Joseph | 188/249 |
| 1,632,782 | 6/1927 | Bendix et al. | 188/250 D |
| 1,755,830 | 4/1930 | Loughead | 188/79.5 GE X |
| 2,037,109 | 4/1936 | Berry et al. | 188/249 X |
| 3,074,514 | 1/1963 | Mossey et al. | 188/79.5 GC |
| 3,103,261 | 9/1963 | Borgard | 188/79.5 GC |

FOREIGN PATENT DOCUMENTS

| | | | |
|---|---|---|---|
| 683356 | 2/1965 | Italy | 188/250 B |
| 681308 | 10/1952 | United Kingdom . | |
| 929001 | 6/1963 | United Kingdom . | |

*Primary Examiner*—Duane A. Reger

[57] ABSTRACT

A brake shoe structure which provides resiliency and increased lateral strength at at least one end of the table of a fabricated brake shoe. A portion of the web at that one end of the brake shoe is spaced inward from the radially inner surface of the table to provide a relief area to accommodate deformation of the table at that end of the brake shoe under dynamic braking conditions. The table at that end of the brake shoe extends longitudinally beyond the circumferential edge of the web where it is formed as a lip extending laterally across the table and radially inwardly to provide lateral strength to that end of the brake shoe table.

15 Claims, 3 Drawing Figures

BRAKE SHOE

BACKGROUND OF THE INVENTION

This invention relates to a brake mechanism for an automotive vehicle and more specifically to an improved fabricated brake shoe which is particularly useful in a brake mechanism employing floating brake shoes.

For purposes of this invention, floating brake shoes shall mean those brake shoes which when assembled in a brake mechanism are actuated at one end and, although anchored at the other end to resist the brake torque, they are not fixedly anchored to the brake mechanism support, but are free to move or float relative to an abutment serving as the anchoring surface. The improved brake shoe of this invention is particularly useful in dual actuated brake mechanisms in which both brake shoes become leading brake shoes. One such brake mechanism is disclosed in U.S. Pat. No. 3,269,492, which issued to F. T. Cox, et al, on Aug. 30, 1966.

The brake shoes employed in that as well as other brake mechanisms are comprised of an elongate curved table which supports the friction lining and a web extending along a substantial length of the inner surface of the table to reinforce the brake shoe table and provide means for mounting and moving the brake shoe. In a fabricated brake shoe the web is formed as a separate element and welded to the inner surface of the table. The brake shoe webs have commonly been dimensioned to extend from edge to edge across the full arcuate length of the table. This reinforces the arcuate length of the brake shoe and provides maximum support to the longitudinally spaced edges of the brake shoe table at the relatively high temperature and pressure generated under dynamic braking conditions.

The structure of the fabricated brake shoe of the present invention deviates from this practice and improves performance under dynamic braking conditions.

SUMMARY OF THE INVENTION

The fabricated brake shoe of the present invention is comprised of an elongate curved table, a web secured along a substantial length of its radially outer edge to the radially inner surface of the table and a portion of at least one end of the radially outer edge of the web being spaced inward from the radially inner surface of the table. The brake shoe of the present invention also includes a lip transversing the brake shoe table and extending inward adjacent one end of the brake shoe web.

In a preferred embodiment of the invention, the end of the web at the trailing edge of the brake shoe is spaced inward from the radially inner surface of the table to provide a relief space and the trailing edge of the brake shoe table is formed as a lip transversing the table and extending inward adjacent the web at that end of the brake shoe.

The improved brake shoe structure of the present invention permits the brake shoe table to defect and change its effective radius of curvature at the anchor end of the brake shoe and thereby conform to brake drum ovality, which reduces the pressure level at the anchor end of the shoe. Further improvement is realized by distributing the remaining pressure more evenly across the brake shoe section at the anchor end. The former is accomplished by the web relief which permits the anchor end of the table to conform to the ovality of the brake drum under dynamic braking conditions. The lip distributes the load laterally across the trailing edge of the table and since the lip extends longitudinally beyond the trailing edge of the web it also provides additional strength extending circumferentially in both directions away from the trailing edge of the web. The lip thus enhances both the circumferential and lateral strength of the brake shoe table adjacent the trailing edge of the web.

The above and other objects and advantages of the invention will be apparent from the following description of one embodiment of the invention.

BRIEF DESCRIPTION OF THE DRAWINGS

In the drawings, wherein like reference numerals denote like parts.

DESCRIPTION OF THE INVENTION

Figure 1:
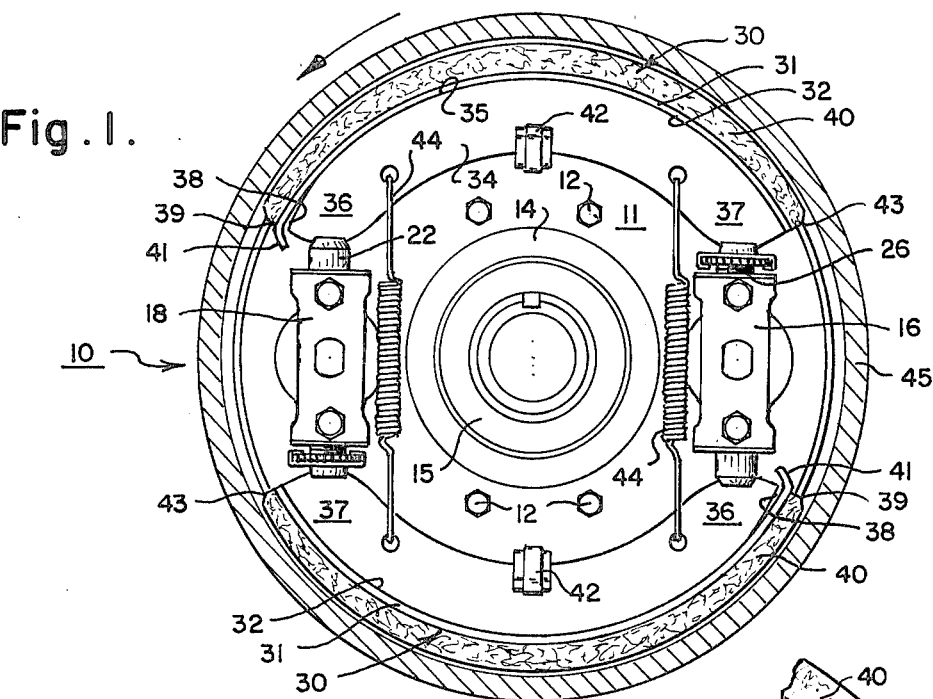
FIG. 1 is a side elevation of a brake assembly incorporating the present invention.

With reference to the drawings, there is shown a wedge actuated internal expanding brake assembly generally designated by the numeral 10. The brake assembly is supported on a spider 11 secured by a plurality of bolts 12 to a flange 14 which may be formed integrally with or welded to the axle housing 15. The brake actuating mechanisms are contained within and supported by the actuator housings 16 and 18 formed integrally with the spider 11.

Figure 3:
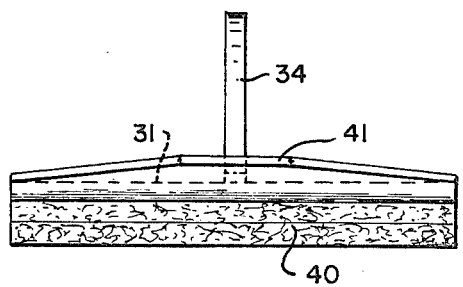
FIG. 3 is a view taken along the line 3—3 of FIG. 2.
Figure 2:
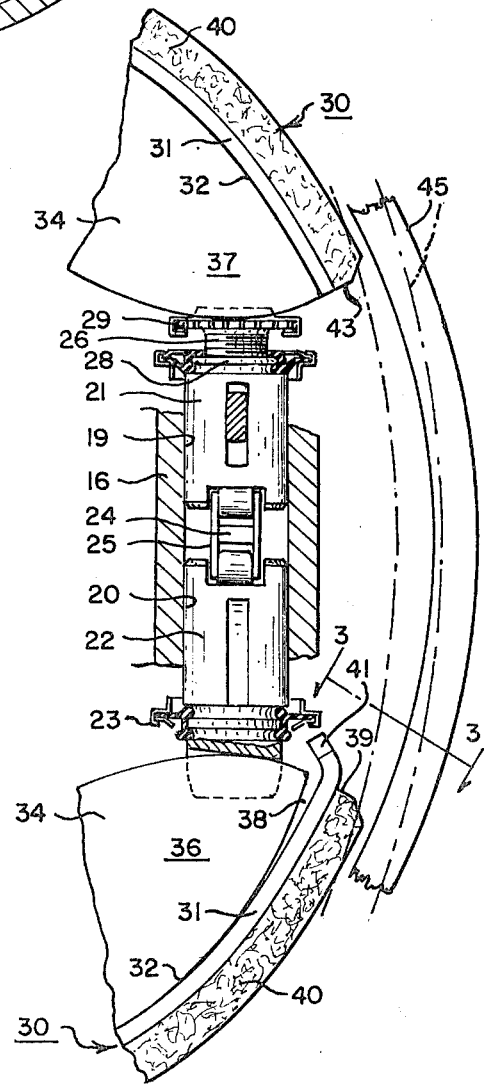
FIG. 2 is a fragmentary view, partly in section and enlarged showing portions of the brake assembly of FIG. 1.

As best shown in FIG. 3, the actuator housing 16, which is identical to actuator housing 18, is provided with aligned cylindrical bores 19 and 20 which slidably support tappet assemblies 21 and 22 and an opening on the reverse side of the spider through which a brake actuating plunger extends. The inner end of the brake actuating plunger is formed as a wedge 24 and carries a roller mechanism 25. The roller mechanism 25 engages the inner ends of the tappet assemblies 21 and 22 and moves the tappet assemblies axially outward in the bores 19 and 20 in response to inward movement of the wedge 24. The tappet assembly 21 is comprised of an inner screw 26, a nut 28 and a ratchet mechanism for rotating the nut 28 relative to the screw 26 to automatically adjust the brake running clearance in response to wear. A star wheel 29 is integrally formed on the end of screw 26 and provides means for manually adjusting the brake clearance. The tappet assembly 22 may comprise a plunger fitted with a dust shield 23. Corresponding components of the actuator housing 18 are identified by the same reference numerals as used in describing the components of actuator housing 16.

The brake assembly 10 includes a pair of fabricated brake shoes 30 slidably carried by the spider 11. Each brake shoe is comprised of an elongate curved table 31 and a web 34 secured to the radially inner surface 32 of the table 31. A substantial length of the radially outer edge 35 of the web is in abutment with and secured by welding to the inner surface 32 of the brake shoe table 31 and an end portion 36 of the web is spaced radially inward from the surface 32 of the table 31 to provide a relief 38 at the trailing edge 39 of the brake shoe. The web end portion 37 at the leading edge 43 of the brake shoe may also be spaced inward from the table 31. However, it is not considered necessary to provide a relief at the leading edge of the brake shoe since, as soon will become apparent, the longitudinally spaced edges 39 and 43 of the brake shoe 30 are subject to different effects when the brake assembly is actuated.

The brake shoe tables 31 support friction lining 40 and are formed as a lip 41 at the trailing edge 39 of each brake shoe 30. The lip 41 of each brake shoe 30 extends inward adjacent the end portion 36 of the brake shoe web and, as best shown by FIG. 3, extends laterally across the full width of the brake shoe table 31.

The brake shoe webs 34 are slidably guided by spring clips 42 secured to the spider 11. The opposite ends of the brake shoe webs are biased into contact with the ends of the tappet assemblies extending from the actuator housings 16 and 18 by a pair of return springs 44. The actuator housings 16 and 18 are each disposed between adjacent ends of the brake shoe webs 34 and, when the brake assembly is actuated, the wedges 24 move into the actuator housings 16 and 18 and drive the tappet assemblies 21 and 22 outward in their respective bores. The tappet assemblies move the brake shoes 30 outward until the friction lining 40 contacts a cylindrical friction surface of a brake drum 45 secured to a wheel, not shown, but mounted for rotation about the brake shoes 30 and axle housing 15.

As the friction lining contacts the friction surface of the brake drum, the torque tends to move the brake shoes 30 in the same direction the drum is rotating. Thus, if the brake drum 45 is rotating counterclockwise, as indicated by the arrow in FIG. 1, frictional contact between the friction lining 40 and the brake drum 45 tends to move each of the brake shoes 30 in a counterclockwise direction and the tappet assemblies 22 serve as abutments anchoring that end, i.e., the trailing edges 39 of each brake shoe, to resist the friction induced torque.

Although the tappet assemblies 22 anchor the trailing edges 39 of the brake shoes 30, as best shown by FIG. 3, the trailing edges of the brake shoes are not fixedly anchored to the tappet assemblies 22. The ends 36 of the brake shoe webs 34 at the trailing edges of the brake shoes are free to slide outward on the inclined abutting surfaces of the tappet assemblies 22.

The trailing edges of the brake shoes 30 are slidably anchored in areas of the brake assembly where the brake drum is subject to significant distortion under dynamic braking conditions. Although the brake drum 45 is shown in FIG. 1 to be circular and concentric with the brake shoe tables 31, when the brake assembly is actuated, the pressure applied by the tappet assemblies 21 and 22 and the temperature generated by frictional contact with the brake lining 40 causes the brake drum 45 to distend in the vertical direction relative to the orientation of FIG. 1. The brake drum 45 contracts in the horizontal direction and, as represented by phantom lines in FIG. 3, moves toward the actuator housings. Thus the configuration of the brake assembly 10, as shown by FIGS. 1 and 3, undergoes significant dimensional changes under dynamic braking as the anchor ends 36 of the brake shoe webs slide outward toward a contracting section of the brake drum 45.

The relief 38 provided between the end portion 36 of the brake shoe web 34 and the brake shoe table 31 permits the trailing edge 39 of the brake shoe table to move inward toward the web and accommodate the dimensionally changing configuration of the brake assembly under dynamic braking conditions. This reduces the pressure level at the trailing edge of the brake shoe. The lip transversing the brake shoe table 31 structurally reinforces the unsupported trailing edge of the brake shoe and distributes the remaining pressure across the width of the brake shoe table to prevent lateral distortion under dynamic braking conditions.

The brake shoe structure of the present invention provides for more uniform wear of the friction lining material and minimizes undesirable vibration by avoiding the high localized pressure previously encountered at the trailing edge of the brake shoe.

The relief may be provided to conventional brake shoes by cutting or sawing a portion of the web away at the trailing edge of the brake shoe. However, it is preferred to form a major portion of the outer edge of the brake shoe web to the same radius of curvature as the inner surface of the brake shoe table and to blend that radius into a smaller radius of curvature at the trailing edge of the brake shoe web. The smaller radius is preferably selected to enable the end portion of the brake shoe web to support the trailing edge of the brake shoe table after the trailing edge has been deflected inward under dynamic braking conditions.

Significantly improved performance has been achieved in tests conducted on a $15\frac{1}{2}$ inch nominal diameter brake assembly of the type shown in FIG. 1 by utilizing brake shoes having tables formed from a highly ductile, 0.179 inch thick by 8 inches wide by 16 inches long SAE No. 1020 steel sheet. The inner surface of the brake shoe tables and the outer edge of the brake shoe webs formed to a radius of about $7\frac{1}{4}$ inches and a radius of about 7 inches was blended for an arcuate distance of about one inch at the trailing edge of each brake shoe web. The radii forming the outer edge of the brake shoe webs were off-set to provide a wedge-shaped relief about one inch long and increasing from a gap of zero to about 0.075 inches at the trailing edge of the brake shoe.

The invention may be embodied in other forms without departing from the spirit or essential characteristics thereof. The foregoing description is, therefore, to be considered as illustrative and non-restrictive, the scope of the invention being defined by the appended claims and all changes to the described embodiment which come within the meaning and range of equivalency of the claims are therefore intended to be embraced thereby.

What is claimed and desired to be secured by Letters Patent is:

1. A brake shoe for an internal expanding brake comprising an elongate curved table and a web secured to said table, the radially outer edge of said web being secured along a substantial length to the radially inner surface of said table and a portion of said radially outer edge at one end of said web being spaced inward from said radially inner surface of said table to provide a relief permitting the corresponding end of said table to deflect inwardly with supporting contact with said web.

2. A fabricated brake shoe comprising an elongate curved table and a web extending substantially the entire length of the radially inner surface of said table, said web having a first radially outer edge surface curved complimentary with and secured along a major length of the radially inner surface of said table and a second radially outer edge surface spaced inward from said radially inner surface at one end of said table whereby said major length of said table is supported by said first radially outer edge surface and said one end of said table is free to deflect inward under dynamic braking.

3. The brake shoe defined by claim 2 wherein said one end of said brake shoe table extends beyond the corresponding end of said web and is formed as a lip transversing said table and extending inward.

4. A brake shoe comprising an elongate curved table, a web secured along a substantial length of the radially inner surface of said table, and at least one edge of said table extending longitudinally beyond one end of said web is bent inward to form a lip transversing said table and structurally reinforces said edge portion of said table.

5. The brake shoe defined by claim 2 wherein a portion of the radially outer edge of said one end of said web is spaced inward from the radially inner surface of said table to provide a relief permitting the corresponding end of said table to deflect inwardly.

6. A fabricated brake shoe comprising an elongate curved table having longitudinally spaced edges, a web secured to the radially inner surface of said table between said edges and at least one of said edges bent to form a lip extending laterally across said table and inward adjacent one end of said web.

7. The brake shoe defined by claim 6 wherein a portion of the radially outer edge of said one end of said web is spaced inward from said radially inner surface of said table to provide a relief permitting the corresponding end of said table to deflect inwardly.

8. A brake assembly comprising a support,
a pair of fabricated brake shoes slidably carried by said support, each brake shoe comprising a curved table and a web secured to the radially inner surface of said table,
a brake drum mounted for rotation about said brake shoes,
means for moving each brake shoe outward into frictional contact with said brake drum,
means abutting one end of each said brake shoe web and preventing rotary movement of said brake shoe in response to friction contact with said brake drum, and
a space between said one end of each brake shoe web and the radially inner surface of its respective table to permit the corresponding end of said table to deflect inward during dynamic braking.

9. The brake assembly defined by claim 8 wherein the corresponding end of each said brake shoe table is formed as a lip extending circumferentially beyond said one end of said brake shoe web and radially inward.

10. The brake assembly defined by claim 8 wherein said means for moving said brake shoes outward comprise a pair of actuators with each actuator secured to said support between adjacent ends of said brake shoe webs,
a pair of tappets slidably mounted in each said actuator and extending into abutment with said adjacent ends of said brake shoe webs and said tappets provide said means abutting and preventing rotary movement of said brake shoes.

11. A brake assembly comprising
a support,
a pair of fabricated brake shoes slidably carried by said support, each brake shoe comprising an elongate curved table having longitudinally spaced edges and a web secured to the radially inner surface of said table between said edges,
a brake drum mounted for rotation about said brake shoes,
means for moving each brake shoe outward into frictional contact with said brake drum,
means abutting one end of each said brake shoe web and preventing rotary movement of its respective brake shoe in response to friction contact with said brake drum, and
a lip bent inwardly at said one end of each said brake shoe, each said lip being formed from a portion of its respective brake shoe table extending beyond said brake shoe web and traversing its respective brake table.

12. The brake assembly defined by claim 11 wherein a portion of the radially outer edge of said one end of each brake shoe web is spaced inward from said radially inner surface of said table to provide a relief permitting the corresponding end of said table to deflect inwardly.

13. A brake shoe comprising an elongate curved table having an inner surface formed to a substantially constant radius of curvature and a web secured to said table, a substantial length of the radially outer edge of said web being formed to substantially the same radius of curvature as said radially inner surface of said table and secured thereto and a portion of said radially outer edge at one end of said web being formed to a radius of curvature less than the radius of curvature of said inner surface of said table and spaced inward from said radially inner surface of said table to provide a relief permitting the corresponding end of said table to deflect inwardly into supporting contact with said web.

14. A brake shoe comprising an elongate curved table and a web secured to said table, the radially outer edge of said web being secured along a substantial length to the radially inner surface of said table, a portion of said radially outer edge at one end of said web being spaced inward from said radially inner surface of said table and at least one edge of said table extending longitudinally beyond said one end of said web is bent inward to form a lip extending laterally across said table and structurally reinforces said edge portion of said table.

15. A brake shoe comprising an elongate curved table having an inner surface formed to a substantially constant radius of curvature and a web secured to said table, a substantial length of the radially outer edge of said web being formed to substantially the same radius of curvature as said radially inner surface of said table and secured thereto and a portion of said radially outer edge at one end of said web being formed to a radius of curvature less than the radius of curvature of said inner surface of said table and spaced inward from said radially inner surface of said table to permit the corresponding end portion of said table to deflect inward under dynamic braking to a position where it is supported by said one end portion of said radially outer edge.

* * * * *